I. PASCAL.
TIRE.
APPLICATION FILED FEB. 14, 1917.
1,255,565.
Patented Feb. 5, 1918.
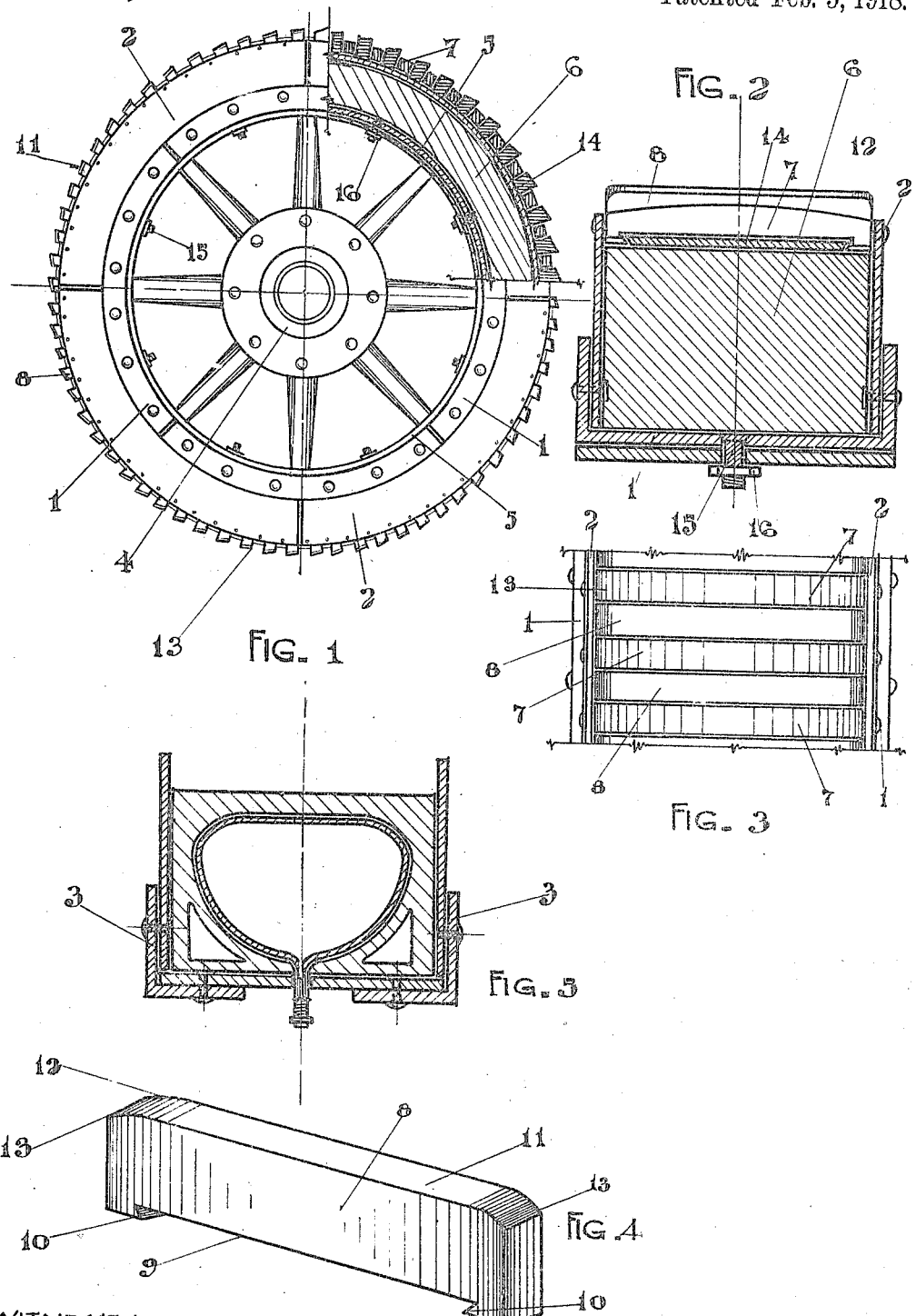

UNITED STATES PATENT OFFICE.

ISRAEL PASCAL, OF MONTREAL, QUEBEC, CANADA.

TIRE.

1,255,565. Specification of Letters Patent. Patented Feb. 5, 1918.

Application filed February 14, 1917. Serial No. 148,583.

*To all whom it may concern:*

Be it known that I, ISRAEL PASCAL, a subject of the King of Great Britain, and resident of 1210 St. Urbain street, in the city of Montreal, Province of Quebec, in the Dominion of Canada, have invented certain new and useful Improvements in Tires, of which the following is the specification.

The invention relates to improvements in tires as described in the present specification and illustrated in the accompanying drawings that form part of the same.

The invention consists essentially of the novel construction of the tread portion of the wheel, whereby the cushioning member is entirely inclosed and free from contact with the roadway.

The objects of the invention are to devise a wheel which will give both efficient and lasting service over any roadway or other surface, to simplify the parts and their arrangement in such device and thus avoid complications and inconveniences to drivers in the pursuit of their avocations, to insure easy riding for the body of the vehicle, to eliminate skidding on turning and generally to provide a wheel simple and cheap to manufacture and durable and serviceable in use.

In the drawings, Figure 1 is a side view of the wheel showing the rim and tread parts in section.

Fig. 2 is a cross sectional view of the rim and tread parts.

Fig. 3 is a plan view of the tread parts proper.

Fig. 4 is a detail of a tread member.

Fig. 5 is a detail showing a modification of the cushion receptacle.

Like numerals of reference indicate corresponding parts in each figure.

Referring to the drawings, the channel sections 1 are riveted to the outstanding walls 2, and form therewith a circumferential tire cushion receptacle, said channels 1 being in half, quarter or smaller sections and here shown as joined together by the overlapping of the said walls 2, though the said walls and channels may form sections and be joined otherwise, or the walls and channel bed may be joined by angle pieces 3 as shown in Fig. 5, for such variations in construction will not be a departure from the spirit of the invention.

The cushion receptacle so formed to complete the circle of the wheel 4 is rigidly bolted to the rim 5 of said wheel, which may be made of particular shape to correspond with a similar shape of the receptacle base or plain like the form shown and described herein.

The solid rubber ring 6 is placed in the channel receptacle aforesaid and rests on the bed of said channel, said walls 2 extending beyond the outer periphery of said rubber ring and parallel therewith in the circular path of the tire.

The transverse spacing bars 7 are rigidly secured to the walls 2 and are convex on the outer side and recessed in the underside for a spring member, said bars being also above the surface of the rubber ring 6 and spaced a reasonable distance therefrom.

The tread members 8 are formed with a dovetailed inner surface 9, formed by the undercuts 10 near each end, and the slightly beveled surface 11 on the outer side forming the gripping edges 12, said outer surface at each end 13 curving inwardly to avoid abrasive corners.

The spring steel band 14 is inserted through all the tread members 8 in the dovetailed inner surfaces 9 between the undercuts 10 and fastened at the ends to form a secure locking bar in holding the tread members 8 in their places between the transverse bars 7 and securely over the rubber cushion 6, the ends of said tread members 8 resting on said rubber directly and the space between said ends resting on the rubber through the spring steel band 14.

The cushion receptacle is preferably made of a good quality of metal wrought or forged and the transverse bars are likewise metal, as well as the tread members 8, while the rubber cushion and steel band provide the resiliency to absorb the shocks occasioned by uneven surfaces over which the wheel may travel.

The said transverse bars are for spacing the said tread members as mentioned and it may be pointed out that this spacing may be arranged to distribute the said tread members at greater or lesser distances from one another, according to the seasons and other conditions affecting the roadways or surfaces over which the vehicle supported by the wheels equipped with this tire may travel.

In equipping a wheel with this tire the channel pieces or sections formed by angle bars and plates, as the case may be, are assembled preferably in the manner described, so that the overlapping side walls of the cushion receptacle forms the means of joining the sections rigidly together and the whole becomes an open annular chamber in which the rubber ring is already inclosed. The locking band 14 is then inserted in the dovetail grooves in the members 8, which are spaced apart by the bars 7, the latter also receiving said band in the underside recesses. The band 14 is inserted through the undercuts in the members 8, the band with members 8 is then placed within the side walls 2 and the ends of the band secured together, the spacers 7 are then placed on the band 14, one between each two members 8 and the spacers secured to the walls as assembled.

The transverse bars are rigidly secured to the walls at the outer edges of said walls by cap screws or other fastenings. The cushion receptacle is secured to the wheel rim by the bolts 15 projecting outwardly from the channel bed beneath the rubber cushion, said bolts extending through the wheel rim and secured by the nuts 16, said bolts being held in against the resilient ring to pass the wheel rim to the bolt holes or entering suitable slots from one side of the rim as may be hereafter found convenient. Other means of securing the tire to the wheels may be used as it depends on the shape of the rim and corresponding shape of the cushion casing as to the particular method of fastening.

The tire in use depends on its resilient members, the rubber ring and steel band and these parts are quite unexposed and the only contact pieces are the tread members and on occasions the transverse bars, consequently the maintenance of the tire is very economical as compared with others in which the rubber is exposed.

Further this construction may be modified as shown in Fig. 5, so as to include pneumatic cushions for a lighter class of vehicles, because the tire described in detail more particularly refers to that class of tire used on trucks for the cartage of freight and heavy loads generally, and where it is applied to the lighter passenger vehicles instead of a solid rubber ring the cushion will be hollow or contain an inner tube, which will receive the impact from each tread member and absorb the shock.

Various changes may be made in the construction and so long as they remain within the scope of the claims for novelty following they will distinctly have to do with this invention.

What I claim is:—

1. In a tire, a circular casing in channel form having transverse slats forming the covering, a plurality of tread members between said slats and having dovetailed inner surfaces, a band of spring material engaging said inner surfaces and locking said tread members and a resilient filling in said casing forming a bearing for said tread members.

2. In a tire, a circular casing in channel form having transverse slats forming the covering, a plurality of transverse tread members having contact edges formed by beveled outer surfaces and sloping ends, said tread members being inserted between said slat members, a resilient filling in said casing forming a bearing for said tread members and a spring steel band engaging the undersides for locking said tread members flexibly over said resilient filling.

Signed at the city of Montreal, Quebec, Canada, this 29th day of January, 1917.

ISRAEL PASCAL.

Witnesses:
E. J. FETHERSTONHAUGH,
N. FETHERSTONHAUGH.

Copies of this patent may be obtained for five cents each, by addressing the "Commissioner of Patents, Washington, D. C."